United States Patent
Cleenewerck et al.

(10) Patent No.: US 8,460,737 B2
(45) Date of Patent: Jun. 11, 2013

(54) EDIBLE PRODUCTS WITH LOW CONTENT OF SATURATED AND TRANS UNSATURATED FATS

(75) Inventors: Bernard Cleenewerck, Knokke-Heist (BE); Toshio Ushioda, Kaizuka (JP)

(73) Assignee: Fuji Oil Company, Limited, Osaka (JP)

( * ) Notice: Subject to any disclaimer, the term of this patent is extended or adjusted under 35 U.S.C. 154(b) by 1017 days.

(21) Appl. No.: 12/278,518

(22) PCT Filed: Nov. 21, 2006

(86) PCT No.: PCT/EP2006/068709
§ 371 (c)(1),
(2), (4) Date: Nov. 10, 2008

(87) PCT Pub. No.: WO2007/090477
PCT Pub. Date: Aug. 16, 2007

(65) Prior Publication Data
US 2009/0068318 A1    Mar. 12, 2009

(30) Foreign Application Priority Data
Feb. 8, 2006 (EP) ................................. 06101421

(51) Int. Cl.
*A23D 9/00* (2006.01)

(52) U.S. Cl.
USPC ........................... 426/607; 426/601

(58) Field of Classification Search
USPC .............................. 426/607, 601
See application file for complete search history.

(56) References Cited

U.S. PATENT DOCUMENTS

| | | | |
|---|---|---|---|
| 4,247,471 A | | 1/1981 | Klein et al. |
| 4,701,335 A * | | 10/1987 | Doornbos et al. ............ 426/533 |
| 4,703,928 A * | | 11/1987 | Escher ........................ 482/110 |
| 4,839,192 A * | | 6/1989 | Sagi et al. ................... 426/607 |
| 4,910,037 A * | | 3/1990 | Sagi et al. ................... 426/601 |
| 5,013,573 A * | | 5/1991 | Bodor et al. ................. 426/602 |
| 5,061,506 A * | | 10/1991 | Leach ......................... 426/602 |
| 5,431,948 A * | | 7/1995 | Cain et al. ................... 426/607 |
| 5,447,735 A * | | 9/1995 | Miller ........................ 426/285 |
| 5,554,408 A * | | 9/1996 | Cain et al. ................... 426/607 |
| 5,718,938 A | | 2/1998 | Cain et al. |
| 5,731,027 A * | | 3/1998 | Cain et al. ................... 426/607 |
| 5,786,019 A * | | 7/1998 | Cain et al. ................... 426/607 |
| 5,858,427 A * | | 1/1999 | Cain et al. ................... 426/101 |
| 5,879,735 A * | | 3/1999 | Cain et al. ................... 426/603 |
| 5,912,042 A * | | 6/1999 | Cain et al. ................... 426/607 |
| 5,935,627 A * | | 8/1999 | Cain et al. ................... 426/93 |
| 5,968,584 A | | 10/1999 | Cain et al. |
| 5,972,412 A | | 10/1999 | Sassen et al. |
| 6,171,636 B1 | | 1/2001 | Sassen et al. |
| 6,277,433 B1 * | | 8/2001 | Lantz et al. ................. 426/606 |
| 6,475,548 B2 * | | 11/2002 | Bons et al. .................. 426/603 |
| 6,777,018 B2 * | | 8/2004 | Floeter et al. ............... 426/603 |
| 7,108,888 B2 * | | 9/2006 | Floeter ....................... 426/603 |
| 7,309,508 B2 * | | 12/2007 | Bach et al. .................. 426/607 |

FOREIGN PATENT DOCUMENTS

| | | |
|---|---|---|
| EP | 0321227 * | 12/1988 |
| EP | 0 687 142 B1 | 12/1995 |
| EP | 0 731 645 B1 | 9/1996 |
| EP | 1 419 699 B1 | 5/2004 |
| EP | 1 491 097 A1 | 12/2004 |
| WO | 94/19953 | 9/1994 |
| WO | 95/07619 | 3/1995 |
| WO | 95/07620 | 3/1995 |
| WO | WO 97/28695 | 8/1997 |

OTHER PUBLICATIONS

Swern, D. 1979. Bailey's Industrial Oil and Fat Products, vol. 1, 4th edition. John Wiley & sons, New York, p. 415, 417.*
Timms, Ralph E., Confectionery Fats Handbook, Properties, Production and Application, Chapter 3, Analytical methods, 2003, pp. 63-66, vol. 14, The Oily Press, UK.
Paquot C. et al., Standard Methods for the Analysis of Oils, Fats and Derivatives, 1987, pg. 59-70, 7th Edition, Blackwell Scientific Publications.

* cited by examiner

*Primary Examiner* — Carolyn Paden
(74) *Attorney, Agent, or Firm* — Scully, Scott, Murphy & Presser, P.C.

(57) ABSTRACT

The present invention relates to a structured, fat continuous edible product, wherein the edible product contains, expressed on total product basis, a) less than 30 wt. % of saturated fatty acids, b) between 20 and 100 wt. % of a triglyceride composition c) between 0 and 80 wt % of a filler material d) less than 15 wt. % of water wherein the triglyceride composition contains with respect to the weight of the triglyceride composition e) less than 45 wt. % of saturated fatty acids, f) less than 10 wt. % of trans unsaturated fatty acids g) at least 8 wt. % of SUS triglycerides, wherein S is a C16-18 saturated fatty acid, U is unsaturated fatty acid having at least 18 C atoms, h) less than 15 wt. % of S3, i) at least 90 wt. % of C8-18 fatty acids, j) at least 75 wt. % of C18 fatty acids including saturated and unsaturated fatty acids, k) has an SFC at 20° C. of between 5 and 50%. The present invention also relates to the use of this structured product in the preparation of fat continuous as well as non-fat continuous products.

105 Claims, 1 Drawing Sheet

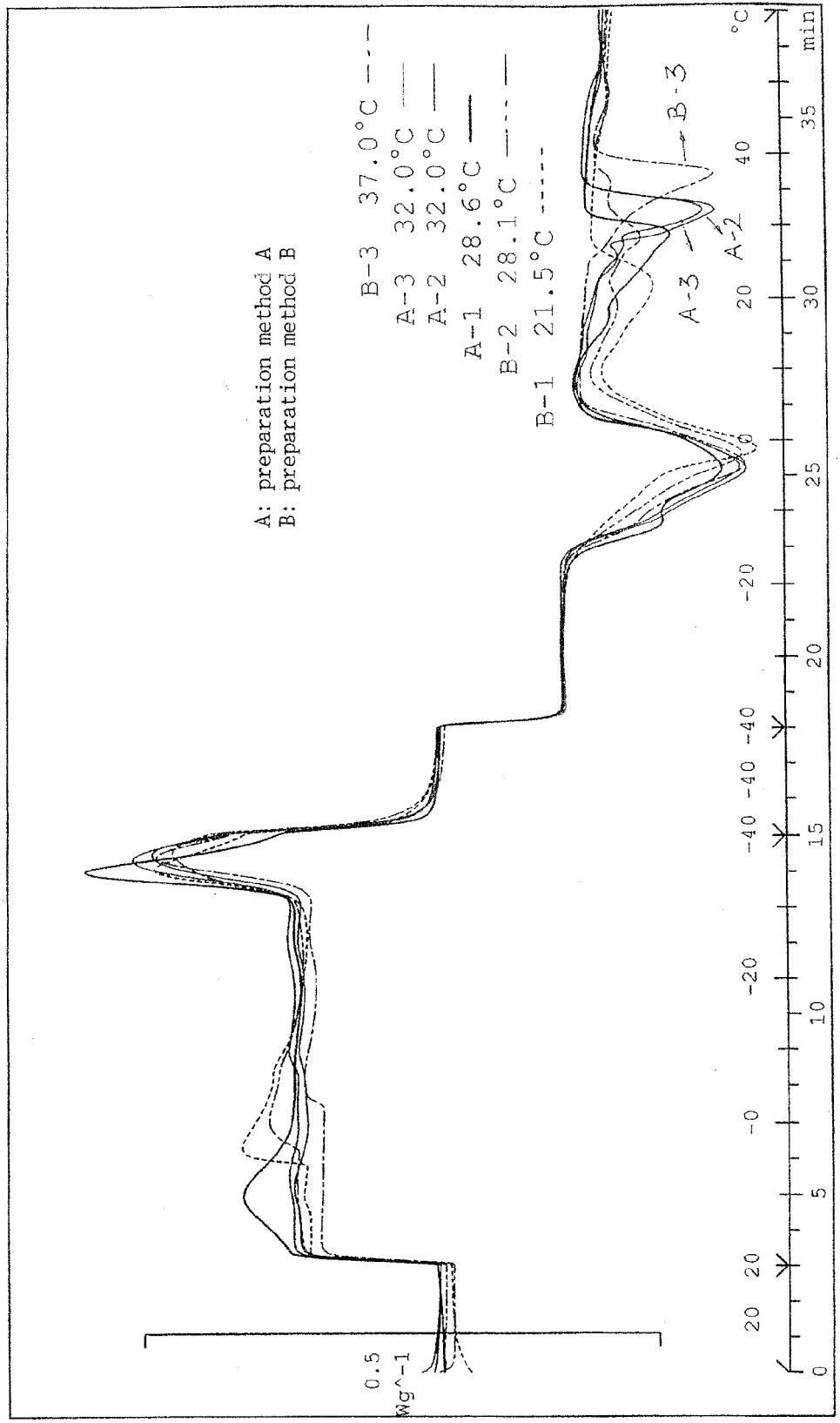
Melting profiles obtained by subjecting sample A and B to the temperature-time regime of example 7

EDIBLE PRODUCTS WITH LOW CONTENT OF SATURATED AND TRANS UNSATURATED FATS

The present invention relates to a structured, fat continuous edible product. The present invention also relates to triglyceride compositions suitable for use in such an edible product and to processes for producing such an edible product.

1. BACKGROUND OF THE INVENTION

In a wide variety of food products, fat is used as a major component not only because of its nutritional importance, but also because of its wide range of functional properties. Fat has been found to be an ingredient which may be suitably combined with a wide variety of dry ingredients, often powdery ingredients. In these applications the fat will mostly be added in the liquid state or under shortenised form to a homogeneous mass of the dry ingredients. In other applications fat is combined with water and some dry ingredients. A homogeneous product is obtained when emulsifying the fat with the water.

One of the most important functional properties of the fat is its effect on the structure of the final food product in which it is incorporated. The structure of a product depends on both its recipe—i.e. the amount and nature of the fat and the other ingredients—and on the process according to which the product is made. For example processing steps such as emulsification, heating, tempering, influence the structure of the product obtained.

An example of a food product where the nature of the incorporated fat has a prominent effect on the structure is chocolate. Chocolate has a hard structure because of the incorporation of cocoa butter which is a hard fat; confectionery creams like medium hard sandwich creams contain a medium hard fat; spreads for example chocolate spreads, contain high amounts of liquid oil giving the typical soft and spreadable end product. In each of these examples fat is combined with at least one powdery ingredient (for example sugar, milk powder, cocoa powder, etc.).

Depending on the intended application and the final structure envisaged for the application, a fat will be chosen with a specific Solid Fat Content (SFC) as a function of temperature. Typical SFC-profiles for different applications are illustrated in EP-A-739.589 table 22a. The SFC-profile depends mainly on the nature of the fatty acids making up the (tri)glycerides of the fat, on the triglyceride composition, and on the method used to solidify the fat—in particular the crystallisation time and temperature, whether the product has been subjected to tempering or not, etc. Whether a fat at a certain temperature is liquid or solid is determined not only by the chain length of the fatty acids, but in particular by the type of fatty acid, i.e. whether it is saturated or non-saturated, and in case of non-saturated fatty acids, the type of isomer, cis or trans. For products that need a rather firm structure, usually a fat with a rather high SFC-profile will be selected, meaning that the fat will contain a quite high amount of saturated fatty acids and/or trans isomers of non-saturated fatty acids. Saturated fatty acids (SAFA) are abundantly present in natural fats like cocoa butter, palm oil, palmkernel oil, coconut oil, tallow, etc. Trans fatty acids (TFA) of natural origin are mainly found in ruminant fats. Natural vegetable oils and fats do not contain this trans isomer. Although TFA are unsaturated fatty acids, their structure and melting profile is much closer to that of the corresponding saturated fatty acid than to that of their cis-form.

Although a wide range of hard structural fats suitable for producing structured products is naturally available, there is still a big need for fats with a solid structure and a major fatty acid chain ranging from C14 to C20. To obtain such fats, hydrogenation of liquid oils like soy, rapeseed, sunflower, groundnut oil to hard fats has been widely used. Hydrogenation also called "hardening" is usually carried out in the presence of a catalyst. However, hydrogenation not only involves conversion of unsaturated fatty acids into saturated fatty acids (SAFA), but also conversion of cis-unsaturated fatty acids into trans-isomers (TFA). Both the increased amount of SAFA and TFA contribute in converting the liquid oil into a hard fat upon hydrogenation. However, although from a functional point the use of a fat with a rather high amount of SAFA and/or TFA will be recommended to obtain the desired structure, from a nutritional point it is highly preferred to limit the amount of these fatty acids. It has been demonstrated that consumption of SAFA and TFA increases the risk to the occurrence of cardiovascular diseases. Therefore official instances, like WHO, have issued maximum recommended levels of daily intake of SAFA and TFA. Studies on the consumption patterns of fats in food, like the so-called Transfair study, conducted in a number of European countries, indicate that the daily intake of both SAFA and TFA is in a large number of countries far too high.

There is thus a need for triglyceride containing food systems, food products and edible products with a limited level of SAFA and/or TFA, which nevertheless show the desired hard or semi-hard structure appropriate for the intended application. There is also a need for triglyceride compositions which enable producing edible products with a sufficiently hard structure, but with a limited level of SAFA and/or TFA, and to a process for producing such compositions.

2. PRIOR ART

From EP-A-719.090 healthy fats for use in spreads or margarine are known which have a saturated fatty acid content below 35 wt. %. The fats further contain 5-45 wt. % S2U, 0-60 wt. % SU2, 5-95 wt. % U3 and 0-8 wt. % S3. The diglyceride content is below 5 wt. % as it is believed that the presence of diglycerides in margarine fats has a negative impact on the crystallization behavior. The fats disclosed in EP-A-719.090 are characterized by a flat SFC-profile which is typical for margarines, expressed as (N5-N20) being less than 10, where N5 and N20 mean the SFC at respectively 5 and 20° C. The structuring properties provided by the fat composition of EP-A-719.090 are mainly attributed to the presence of 1.5-4 wt. % of behenic acid in the fat. Water in oil emulsions prepared from these fats show a good hardness. When producing the spread, the fat, water and some of the other ingredients and additives are mixed and pasteurized at 85° C., followed by a cooling and crystallization process.

EP-A-875.152 relates to lamination fats with improved lamination properties, good structuring properties, in particular a good hardness and a low saturated fatty acid content. According to EP-A-875.152 this is achieved by the presence of a minimum amount of long chain fatty acids in the triglycerides, in particular by the presence of a minimum amount of arachidic and behenic acid. The fat blend further comprises 70-85 wt. % of a liquid oil and at least 15 wt. % of (H2M+H3) triglycerides, and has a saturated fatty acid content of less than 50 wt. %, a N35<35 and an N20 of 15-40 wt. %. In the above, H designates saturated fatty acids with at least 16 carbon atoms, M designates saturated fatty acids with 6-14 C atoms. The blend is characterised by a certain minimum Stevens hardness so that it suitable for use in puff pastry. The Stevens hardness of the fat blend, which is the hardness measured at 20° C. with a Stevens Texture Analyzer using a cylindrical probe of 4.4 mm diameter, is at least 150 g, preferably between 150 and 800 g. The SAFA-content of the fat blends disclosed in the examples ranges from 29 to 35.2%, the solid fat content at 35° C. ranges from 10.6 to 23.3%.

EP-A-687.142 discloses bakery fats with a saturated fatty acid content of less than 40 wt. %, a trans fatty acid content of less than 5 wt. %, a N20 of at least 10%, a S2U content of 5-50 wt. %, a (U2S+U3) content of at least 35 wt. % and a S3 content of 0-37 wt. %. It is explained that the properties of the baked products are at least similar to those of products having a higher saturated fatty acid content. To achieve this, the dough fat contains a fat component A which is rich in SUS-triglycerides and preferably contains 5-30 wt. % of behenic acid. From the examples it can be seen that preparation of the dough is done by blending the molten fat components, followed by cooling the melt and cool storage overnight, so as to obtain a plasticised fat which is suitable for mixing with the remaining dry ingredients of the dough and water.

EP-A-731.645 discloses blends of a sugar and a triglyceride component with a SAFA content which is lower than usual, i.e. below 45 wt. %. The triglyceride component comprises at least 40 wt. % of SU2 and 3-50 wt. % of S2U, it is free of TFA and has an N20 of at least 35 and an N30 of less than 10. It is explained that the triglyceride component contains at least 10 wt. % of behenic acid, that the triglyceride component contains less than 25 wt. % of StUSt (U=Unsaturated Fatty Acid; St=C18-0) and that the presence of 0.1 to 10 wt. % of trisaturated triglycerides, especially from palm oil stearin, gives better structuring properties. The blends are suitable for use in filling fats and ice cream coatings. Regardless of their limited SAFA-content, the blends display a good product performance, meaning an acceptable texture, a sufficiently high hardness and good oral melting characteristics. The fillings and coatings are prepared by mixing the ingredients, roll-refining and conching, followed by a cooling process (called "tempering") to below 20° C., preferably below 15° C. During the cooling process a working amount of fat seeds, e.g. cocoa butter seeds may be added. In the examples it is explained that after cooling and storing of the fillings at low temperature for longer periods (e.g. 16 hrs. at 7° C. followed by 1 week at 13° C. or 18 hrs at 13° C. in case a seeding agent was used), an acceptable hardness was found. Example 4 discloses a filling fat with a Stevens' hardness at 20° C. of 158 g, the filling contained 50 wt. % of fat, the fat contained 41.7 wt. % of SAFA.

From EP-A-1.543.728 a fatty thickening composition is known, which is suitable for thickening a fat based composition. The thickening composition contains between 15 and 45 wt. % of at least one hydrogenated fat and between 85 and 55 wt. % of at least one liquid oil. The hydrogenated fat is preferably a fully hydrogenated fat with at least 15 wt. % of fatty acids having more than 18 carbon atoms, preferably maximum 22 carbon atoms. The preferred hydrogenated fat is hydrogenated high erucic acid rapeseed oil. According to example 1, cooling of a blend of 25 parts fully hydrogenated high erucic acid rapeseed oil with 75 parts of rapeseed oil gives a solid final product.

All of the above-mentioned patent publications address the problem of providing a structuring fat composition which is low in SAFA, which displays an acceptable hardness and is suitable for use in a final product. However, each time this problem is solved by the use of a fat component which contains behenic and/or arachidic acid, i.e. long hydrocarbon chain fatty acids as the structuring agent. Behenic acid is mostly obtained by hydrogenation. Triglycerides containing one or more of these fatty acids risk to create a waxy mouth feel upon eating, caused by their high melting point, as can be seen by their high solid fat content at 35° C. To avoid the presence of high melting triglycerides, containing more than one of these long chain fatty acids, chemical or enzymatic interesterification is often applied, followed by fractionation. However, this is a complicated and expensive production method. On top of that, sources of behenic and arachidic acid are quite expensive, as their availability is quite limited.

3. OBJECT OF THE INVENTION

There is thus a need for a structured fat continuous edible glyderide containing product with a limited content of saturated and/or trans fatty acids, and a hardness that is sufficiently high and appropriate for the intended application. There is also a need to triglyceride compositions for use in this edible product and to a process for producing such edible products.

It is therefore an object of the present invention to provide such a structured, fat continuous edible product, which in addition has an acceptable texture, a good mouthfeel and a good nutritional profile. In particular it is an object of this invention to provide such a edible product with a harder structure than could be expected on the basis of the triglyceride composition present in the edible product of this invention, in particular on the basis of the saturated and trans fatty acid content.

It is a further object of this invention to provide a process for the production of such a structured, fat continuous edible product, showing a sufficient hardness, at a concentration of saturated and trans fatty acids that is significantly smaller than can be expected from the teaching of the prior art. It is also an object of this invention to provide triglyceride compositions for use in this edible product.

4. BRIEF DESCRIPTION OF THE DRAWING

FIG. 1. Melting profiles obtained by subjecting sample A and B to the temperature time regime of Example 7.

5. DESCRIPTION OF THE INVENTION

This object is achieved according to the present invention, with a structured, fat continuous edible product showing the technical features of the first claim.

Thereto, the edible product contains, expressed on total product basis,
 a) less than 30 wt. % of saturated fatty acids,
 b) between 20 and 100 wt. % of a triglyceride composition
 c) between 0 and 80 wt % of a filler material
 d) less than 15 wt. % of water
wherein the triglyceride composition contains with respect to the weight of the triglyceride composition
 e) less than 45 wt. % of saturated fatty acids,
 f) less than 10 wt. % of trans unsaturated fatty acids
 g) at least 8 wt. % of SUS triglycerides, wherein S is a C16-18 saturated fatty acid, U is unsaturated fatty acid having at least 18 C atoms,
 h) less than 15 wt. % of S3,
 i) at least 90 wt. % of C8-18 fatty acids,
 j) at least 75 wt. % of C18 fatty acids including saturated and unsaturated fatty acids,
 k) has an SFC at 20° C. of between 5 and 50%.

In the above filler material means a non-glyceride edible solid material, preferably present in powdery form.

Within the scope of this invention, fat continuous products are understood to designate products in which the continuous phase is formed by the fat. Examples of such fat continuous products are chocolate fillings and spreads. Baked products or french fries are not to be considered as fat continuous products within the scope of this invention, as the continuous phase of these products is not formed by the fat it contains. Within the scope of this invention, "structured product" means a product with a structure which does not spontaneously and visually separate into two or more phases at room temperature after less than 24 hours of storage.

The edible product of this invention may contain ingredients which themselves contain an oil or fat, for instance hazelnut paste. In that case the hazelnut oil present in the hazelnut paste is considered as part of the triglyceride composition, and the fat free part of the hazelnut paste is considered as part of the filler material. Within the scope of the present invention the filler material, if present, is an ingredient that is added on purpose to the edible product of the present invention. Thus a product consisting of 100% grinded oilseeds, even in case it forms a paste is considered as a filler material, even though it could be considered an oil continuous product, is not to be considered as an edible product according to the invention as its components have not been combined on purpose.

The inventors have found that the edible product of this invention takes a solid structure, even in case only a small part of the triglyceride component is in a crystallized form. If so desired, the edible product of this invention may be left some time for stabilization after having been produced. This results in a stabilization of the crystallized fat and an increase of the hardness of the edible product.

The inventors have also found that the edible product of the present invention is characterised by a texture that is harder than could be expected from the saturated fatty acid content of the product, and harder than the traditionally known products with a similar content of saturated and trans fatty acids, or a similar solid fat content (SFC) at 20° C.

The inventors have further found that the product shows a high oil retention capacity and that the expected spontaneous separation of oil from the product at room temperature does not take place, even in case the edible product of the present invention takes the form of a relatively soft cream. This is surprising since the triglyceride part of the composition has a low to very low saturated fatty acid (SAFA) content and/or a low SFC at 20° C. Because of this low SAFA, the person skilled in the art would never expect it possible to obtain a structured edible product based on a fat having the triglyceride composition of the first claim, without spontaneous oil separation occurring at room temperature. Much to the surprise of the inventor, the liquid oil remains captured within the matrix of the edible product, without tending to oil out at room temperature, i.e. separating the liquid oil from the solid fat. Even when contacted with other products that are capable of absorbing oil, oil loss from the edible product of this invention remains negligible. The ensuing advantage is that the edible product of this invention exhibits a high resistance to oil migration even when contacted with other products that are capable of and/or show a tendency to absorbing oil. An example of such a product is a cream which when contacted with a chocolate shell or when deposited on a biscuit, does not loose a significant part of the liquid oil present in it. With creams showing a bad oil retention capacity, this could quickly result in softening and blooming of the chocolate shell and a hardening of the cream that lost part of the liquid oil.

In the edible product of this invention, the majority of the fatty acids has a chain length between 8 and 18 C-atoms. The remaining part can be fatty acids with a shorter or a longer chain. Shorter chained fatty acids will usually present in case the edible product contains for instance milk fat; longer chained fatty acids are present when the edible product for instance contains groundnut oil.

Hydrogenation of liquid oils or semi-liquid oils is generally considered as a technique for producing hard fats. However, hydrogenation increases the amount of saturated fatty acids in the fat composition. In case of partial hydrogenation, trans fatty acids are built, which also give negative health effects. For this reason, hydrogenation has got a rather bad connotation. Although the edible product of the present invention may contain hydrogenated oils or fats, it is preferred to minimise or even to avoid their use. Therefore, the present invention tends to minimise the use of hydrogenated products in the triglyceride composition, and tends to use triglyceride compositions which are substantially free of hydrogenated fat components.

According to a preferred embodiment, the edible product of the present invention contains expressed on the total weight of the product, less than 28 wt. %, preferably less than 25 wt. % of saturated fatty acids. The triglyceride composition preferably contains less than 40 wt. %, preferably less than 35 wt. %, more preferably less than 30 wt. %, most preferably less than 25 wt. % of saturated fatty acids with respect to its total weight. The triglyceride composition preferably contains less than 5 wt. % of trans unsaturated fatty acids, more preferably less than 2 wt. %. The triglyceride composition further preferably contains less than 10 wt. %, more preferably less than 5 wt. %, most preferably less than 2.5 wt. % of S3. The triglyceride composition also preferably contains at least 85 wt. %, preferably at least 90 wt. % of C18 fatty acids including saturated and unsaturated fatty acids.

Edible products with a good performance in terms of good hardness and low STFA-content are further characterised in that their concentration of C18 fatty acids is at least 80 wt. % with respect to the total weight of the glyceride composition, preferably at least 85 wt. %, most preferably at least 90 wt. %, whereby the C18 fatty acids include saturated as well as unsaturated fatty acids with a chain length of 18 carbon atoms, and thus include stearic acid, oleic acid, elaidic acid, linoleic acid and linolenic acid. A high concentration of C18 fatty acids is interesting from a nutritional point of view since C18 fatty acids, whether saturated or unsaturated in the cis-form, have a lowering effect on total cholesterol and LDL-cholesterol.

Traditionally, to obtain a fat composition or edible products containing that fat with a harder structure, high melting triglycerides like trisaturated triglycerides (S3) were incorporated into the fat composition or the edible product. These can be obtained by full hydrogenation of oils or fats, or by fractionation of natural fats. Although these triglycerides are used because of their structuring properties, their amount is mostly limited, because they are high melting and can cause a waxy mouthfeel. It has now surprisingly been found that in the edible product of this invention high levels of S3 triglycerides had an adverse effect on the hardness of the product. Therefore it is preferred to limit the S3 concentration of in the glyceride composition to less than 10 wt. % with respect to the total amount of the glyceride composition, preferably less than 5 wt. %, more preferably less than 2.5 wt %.

A first preferred embodiment of the edible product of this invention contains
a) between 95 and 100 wt. % of a triglyceride composition
b) between 0 and 5 wt. % of a filler material c) less than 8 wt. % of water d) less than 5 wt. % of one or more additives.

Other preferred embodiments of the edible product of this invention contain between 20 and 95 wt. % of a triglyceride composition, preferably between 25 and 60 wt. %, more preferably between 30 and 50 wt. %; and between 5 and 80 wt. % of a filler material, preferably between 75 and 40 wt. %, more preferably between 70 and 50 wt. %.

Edible products according to a first preferred embodiment of this invention consist exclusively or almost exclusively of fat. These products are mostly intermediate products, which are suitable for use in the processing of final products and which can be structured to obtain a hard texture. Such products, if they contain more than 25 wt. % of SAFA, will have a solid or semi-solid texture. If it is the intention to make these products having a solid or semi-solid texture pumpable, or to mix them with other dry ingredients, e.g. a powdery filling material, the product should have a softer structure or be plastic. This may be achieved by heating the edible product, in order to at least partially melt the solid fat. Another option to provide a softer fat, if this is the intended application, is to make a plastic fat by decreasing the SAFA-content to below 25 wt. % with respect to the weight of the edible product, preferably to below 20 wt %. Such product still has a homogeneous structure and does not tend to oil out at room temperature. Because of their high level of unsaturated fatty acids, often additives will be added to these products to improve their oxidation stability.

Although within the scope of this invention, the edible product may be a shortening, the preferred edible product of the present invention is not a shortening. The edible product of the present invention is a structured fat product, which has a harder texture as compared to a plastic shortening. It is remarked that plastic shortenings are well known structured fat products, which may also exclusively consist of fat, but they have a softer texture and a quite weak oil retention capacity, especially in contact with other porous materials. According to "Bailey's Industrial Oil & Fat Products" (Ed. 5-1996 Vol 3 pg 115 & pg 120), a "shortening is a typically 100% fat product". " . . . shortening, margarine and spreads are formulated to possess special physical characteristics. These products appear to be solid yet, when subjected to a shearing force great enough to cause a permanent deformation, all assume the rheological flow characteristics of a viscous liquid. Such solids are referred to as plastic solids. Their plastic nature enables them to spread readily and combine thoroughly with other solids or liquids without cracking, breaking, or liquid oil separating from the crystalline fat." Shortenings find numerous applications in baked goods, where the fat is used to prevent cohesion of gluten strands.

A second preferred embodiment of the edible product of this invention contains a) between 20 and 95 wt. % of a triglyceride composition, preferably between 25 and 60 wt. %, more preferably between 30 and 50 wt. %;

b) between 5 and 80 wt. % of a filler material, preferably between 75 and 40 wt. %, more preferably between 70 and 50 wt. %.

Products according to this second embodiment contain an amount of fat and an amount of filler material. A typical example of a product according to this second embodiment is a confectionery cream containing 30 to 50 wt. % of fat, 30 to 50 wt. % of sugar and optionally other dry ingredients, like whole and/or skimmed milk powder, cocoa powder, etc. Products of this second embodiment are rather final products that can be used as such or can be part of a composed product e.g. a confectionery filling. Those final products mostly have the structure desired by the final consumer.

Edible products of interest to this invention preferably have a limited water content, which is below 8 wt. %, preferably below 5 wt. %, more preferably below 2 wt. % with respect to the total weight of the edible product. Introducing large amounts of water, like in margarines, leads to different food systems, like for instance an oil in water emulsion, where usually additives or selected ingredients and special processing techniques are applied to stabilise the emulsion.

The edible product of the present invention also is not an emulsion, in particular not a W/O emulsion. W/O emulsions, like margarines, obtain their structure by specific emulsification and solidification techniques and the use of emulsifiers and thickening agents and thus have a structure which differs from the structure of the edible product of the present invention. The product of this invention does not need to be subjected to such techniques to obtain its structure.

Preferably, at least part of the triglycerides present in the structured fat continuous edible product of this invention are in a crystallised form. The crystallised fat has been found to form the basis for the fat-continuous product structure, and to provide a high oil retention capacity. The crystallised triglycerides have been found to provide the structure capable of absorbing and storing oil, or more generally of absorbing fats which are liquid at a given temperature. In the known products the basis of the structure is usually provided by incorporation of an emulsifier or a non-glyceride structuring agent, or by subjecting the product to a processing for example in baking or extrusion. To minimise the risk to the occurrence of a sandy grainy mouthfeel upon eating, the crystal size of more than 90% of the crystallised fat is smaller than 100 µm, preferably smaller than 75 µm, more preferably smaller than 50 µm, most preferably smaller than 25 µm. Larger fat crystals, often are built through recrystallisation upon storage. This phenomenon is well known in the case of margarines, where a change from Beta-prime to Beta crystals, results in a "sandy" product. Larger crystals are also accompanied by a weaker structure of the edible product.

A strong product with a stable structure may in particular be obtained in case at least 50, preferably at least 70, more preferably at least 85 wt. % of the crystallised fat is crystallised in the Beta-form. The Beta-form is the crystal form type V or VI as defined by Wille & Luton.

The product of this invention is characterised by a firm structure, which is built quickly after production, in particular quickly after crystallisation of the solid fat part, with almost no tendency to post-hardening or post-softening. There is thus no need for long storage or storage at low temperature after production of the edible product of this invention, to build a strong structure. The inventors have found that the edible product of this invention is characterised by a hardness which hardly changes upon storage. In particular, the hardness of the edible product after stabilisation at room temperature during one day after production, and after storage for one week after production, differ less than 25%, preferably less than 20%, most preferably less than 10%. This is an advantage over the prior art where special procedures have to be applied to obtain the firm structure.

The triglycerides contained in the edible product of this invention are preferably characterised by a specific DSC melting profile. In particular, the triglyceride composition present in the edible product shows a DSC melting profile in which the high melting triglyceride peak is shifted to lower temperatures of at least 2° C., preferably at least 3° C., more preferably at least 4° C. when comparing the DSC profile of a product, made according to the present invention and which has been left for at least 1 day of stabilisation after production, to the DSC profile of the same product, but after the product has been heated to a temperature high enough to melt the fat, cooled without stirring at room temperature to solidify and left at room temperature to stabilise for one week. The DSC melting profile is measured by subjecting the product to a temperature-time regime according to which the temperature of the product is maintained for 3 minutes at a temperature of 20° C., followed by decreasing the temperature from 20° C. to −40° C. at a cooling rate of −5° C./min, followed by maintaining the temperature of the product for 3 minutes at −40° C., followed by increasing the temperature of the product from −40° C. to +60° C. at a heating rate of +5° C./min. To perform this measurement, preferably use is made of a Mettler Toledo Star System, however equivalent systems may be used as well. Heating to a temperature high enough to melt the fat, means at least heating to 60° C. and keeping for 5 minutes at that temperature. In products with a strong structure the peak corresponding to the high melting triglycerides is shifted towards lower temperatures when compared to the same peak for the pure high-melting SUS-fat in its stable form. Products with a weak structure, do not exhibit such a strong shift. The present invention therefore also relates to structured, fat continuous edible products which contain, expressed on total product basis, a) less than 30 wt. % of saturated fatty acids,
b) between 20 and 100 wt. % of a triglyceride composition
c) between 0 and 80 wt % of a filler material
d) less than 15 wt. % of water and which show such a DSC melting profile.

It has been found that the best results in terms of hardness, mouthfeel and minimum risk to the occurrence of waxiness were obtained with glyceride compositions that contain mainly fatty acids with a chain length between 14 and 18 carbon atoms, preferably at least 90 wt. %, more preferably at least 95 wt. %, most preferably at least 97 wt. % with respect to the weight of the glyceride composition. Although glycerides like lauric fats rich in C-12 fatty acids are capable of building a hard structure, they are high in saturates. On top of that, when combining lauric with non-lauric fats, the fat blend tends to display eutectic effects, meaning a loss in hardness. Therefore it is preferred to minimise their use within the scope of the present invention.

The best results in terms of hardness, combined with a low SAFA and TFA-content are obtained with triglyceride compositions containing at least 10 wt. % of SUS-triglycerides with respect to the weight of the triglyceride composition, preferably at least 15 wt. %, most preferably at least 18 wt. %. Herein S means saturated fatty acids having 16-18 carbon atoms, in particular palmitic and stearic acid, U means unsaturated fatty acids having 18 carbon atoms or more, SUS means triglycerides with a saturated fatty acid in the 1- and 3-position. Thereby, the fatty acid in the 1 and 3 position may be the same or different. As a consequence, StOSt as well as POSt are considered suitable SUS-triglyceride within the frame of this invention. The SUS content will usually be less than 45 wt. %, preferably less than 40 wt. %. The remaining part of the triglyceride composition will mainly consist of tri-unsaturated triglycerides.

Optimum results in terms of hardness and structure of the edible product were obtained with a triglyceride composition in which at least 50 wt. % of said SUS triglycerides consist of StUSt and/or PUSt, preferably at least 70 wt. %, more preferably at least 75 wt. %, most preferably at least 80 wt. %. Optimum structure and hardness was observed with triglyceride compositions in which at least 50 wt. % of the SUS triglycerides consists of StOSt, preferably at least 60 wt. %, more preferably at least 70 wt. %, most preferably at least 80 wt. %, in which St is stearic acid, P is palmitic acid, O is oleic acid, S is a C16-18 saturated fatty acid and U is an unsaturated fatty acid having at least 18 carbon atoms. In fact, it was found that SUS-triglycerides like BOB (B=Behenic acid) had a weaker ability to build structure and that POP built limited structure and hardness only. Within the scope of the present invention it is preferred that the StOSt to POSt ratio of the triglyceride composition is at least 2.5, preferably at least 4, more preferably at least 5, most preferably at least 6. Triglycerides with a high StOSt/POSt ratio such as for example shea stearine were found capable of builing a firmer structure than fats with a lower ratio, such as for example cocoa butter.

In contrast to EP-A-731.645, it was found that the presence of high amounts of SU2 adversely affects the hardness of the edible product. In view thereof the concentration of SU2 triglycerides in the glyceride composition and of the structured product of this invention is preferably limited to less than 38 wt. % with respect to the total weight of the triglyceride composition, preferably less than 30 wt. %, most preferably less than 25 wt. %.

Another traditional way of obtaining structure in a fat composition or an edible product is the incorporation of triglycerides containing one or more C22 fatty acids. The prior art documents describe several compositions, where this type of triglycerides plays an essential role in the formation of the desired hard structure. It has now been found with the present invention that the use of C22 fatty acids is to be minimized as they adversely affect the hardness of edible product of the invention. Therefore, it is preferred to limit the concentration of C22 fatty acids in the edible product of this invention to below 2.5 wt. % with respect to the total weight of the triglyceride composition, preferably to below 1.5 wt. %, more preferably to below 1.0 wt. %, most preferably to below 0.7 wt %. It has now been found with the present invention that by carefully selecting the triglycerides present in the structured edible product of the present invention, its hardness could be significantly increased without requiring the presence of triglycerides containing so-called long-chain fatty acids, i.e. fatty acids having more than 20 carbon atoms.

The Solid Fat Content (SFC) of the structured edible product of this invention and of the triglyceride compositions at room temperature is preferably limited. Thereto, preferred edible products contain triglyceride compositions that are characterised by a N20 of $\leq 40\%$ preferably $\leq 35\%$, preferably $\leq 25$, more preferably $\leq 20$. The inventors have surprisingly found that in spite of this low amount of solid fat, a product with a good structure at room temperature can be obtained. It is also preferred to limit the solid fat content at 35° C., since high values at this temperature indicate poor melting properties in the mouth, creating waxiness. Therefore it is preferred that the N35$\leq 20\%$, preferably $\leq 15$, more preferably $\leq 10$, most preferably $\leq 5$ wherein N20 and N35 are the solid fat content of the triglyceride part and the SFC is measured according to method IUPAC 2.150a.

Preferably the edible product and triglyceride composition of this invention comprise at least one hard or semi hard fat component and at least one liquid component, the liquid component being at least one liquid oil or a mixture of two or more liquid oils. The at least one hard or semi-hard fat is a fat which is a solid or semi-solid fat at room temperature, preferably with a melting point of at least 25° C. With semi-solid fat is meant a fat that at room temperature contains a visible part of solid fat and a visible part of liquid oil. The at least one liquid oil is an oil which is liquid at room temperature.

Preferably, the triglyceride composition and edible product of this invention are characterised in that the amount of the at least one hard or semi-hard fat with respect to the weight of the triglyceride composition ranges from 10-90 wt. %, preferably from 15-60 wt. %, more preferably from 20-45 wt. % and in that the amount of the at least one liquid oil ranges from 10-90 wt. %, preferably from wt. 40-85%, more preferably 55-80 wt. % with respect to the weight of the triglyceride composition. The amounts of the at least one hard or semi-hard fat and liquid oil may vary, mainly depending on the hardness of the hard or semi-hard fat that is chosen, and also depending on the envisaged hardness of the final edible product.

If a liquid oil is chosen as liquid component or part of the liquid component, then preferably this liquid oil will be a vegetable oil selected from the group of rapeseed oil, corn oil, soy oil, sunflowerseed oil, cotton seed oil, maize oil, olive oil, hazelnut oil, groundnut oil, liquid fractions of palm oil or shea butter, a blend of two or more of the afore mentioned oils and fractions thereof. This also includes varieties of afore mentioned oils, like for instance high oleic sunflower oil.

As hard or semi-hard fat, a fat will be preferably used that contains at least 25 wt. %, 35 wt. %, more preferably at least 40 wt. % of SUS-triglycerides with respect to the weight of the hard or semi-hard fat, the SUS-content being less than 85 wt. %, preferably less than 75 wt. %, more preferably less than 65 wt. %, most preferably less than 60 wt %, wherein S is a saturated fatty acid having 16-18 carbon atoms and U is an unsaturated fatty acid having 18 carbon atoms or more whereby the SUS-concentration is expressed on the total weight of hard or semi-hard fat. A good structure with strong oil retention capacity is obtained provided a minimum amount of SUS-triglycerides is present. Therefore the hard fat preferably contains the above mentioned minimum amount of SUS-triglycerides with respect to the weight of the hard or semi-hard fat. The inventors have found that a stronger structure could be obtained with higher SUS-contents, even for products having a low content of saturated fatty acids. Fats with a very high SUS-content can be obtained by fractionation of shea butter or enzymatically prepared symmetrical fats, or by using exotic fats like Illipe fat or Allanblackia fat, however these fats and processes are quite expensive and the availability of these raw materials is quite limited. Very good results in terms of hardness and oil retention capacity are obtained with fats that are less concentrated in SUS-triglycerides, e.g. fats that are less far fractionated or even not fractionated, having an SUS-content of less than 85 wt. %, preferably less than 75 wt. %, preferably less than 65 wt. %, most preferably less than 60 wt. %.

It was found that very suitable hard fat or semi-hard fats comprise cocoa butter, shea butter, fats from illipe butter, kokum fat, sal fat, allanblackia fat, mowrah butter or mango kernel fat, enzymatically prepared fat or a fraction thereof, or a blend of two or more of the afore mentioned fats or fractions thereof. Shea butter has been found a particularly suitable raw material for producing products with a strong structure and low SAFA-content, at a reasonable cost. Therefore, the hard fat used in the structured product of this invention preferably comprises an amount of shea butter, whereby the shea butter preferably contains less than 7 wt. %, preferably less than 5 wt. %, more preferably less than 4 wt. % of unsaponifiable material. The amount of shea butter in the hard fat part can range from 5 to 100 wt %, preferably between 20 and 80 wt %. Although the StOSt-content of this fat is only about 30 wt. %, products containing this fat show a good structure, good eating properties and hard structure with limited SAFA-contents e.g. below 35 or even below 30 wt % on total fat basis. This will mostly be a non-fractionated material, although some fractionation may be applied if necessary. Natural shea butter contains unsaponifiable matter, some of which has a high melting point. It is preferred to remove this matter before use because of its negative impact on the structure of the final product. Within the scope of the present invention, the hard fat may contain an amount of at least one enzymatically prepared fat or a fraction thereof, said fat being characterised by a SUS content between 30 to 85 wt. %, preferably between 35 and 75 wt %. Enzymatic fats, even if not fractionated, give a good performance when used in the structured edible product of this invention. If the SUS-content of the fat is increased by dry fractionation or solvent fractionation, the hardness of the product can be improved for a given level of SAFA. SUS-levels of less than 85, preferably less than 75 wt %, suffice to make very hard products with very low SAFA-levels. Above these levels the production costs would raise too much without adding benefits.

The filler material used in the edible product of this invention will usually be a non-glyceride, edible solid material. A common filler material comprises at least one component selected from the group consisting of sugar, flour, starch, skimmed milk powder, whole milk powder, whey powder, cocoa powder, coffee powder, food grade organic and inorganic solid powders or a blend of two or more of these. Mostly the filler material is a powdery product with a mean particle size of smaller than 500 μm, preferably smaller than 250 μm, most preferably smaller than 100 μm. This small particle size facilitates blending with the fat to a homogeneous product, improves the structure of the end product, at a minimum risk to sensing graininess upon eating. However, other fillers considered suitable by the person skilled in the art may be used as well.

The present invention also relates to a structured, fat continuous edible product with an acceptable texture, a good mouthfeel, a good nutritional profile and a structure which is harder structure than could be expected on the basis of the triglyceride composition present in it, in particular on the basis of the saturated and trans fatty acid content. Such an edible product is characterized by a hardness characterized by an R-value of at least 200, preferably at least 400, more preferably at least 550, most preferably at least 700.

A preferred embodiment of the edible structured, fat continuous product of the present invention as claimed in claim 31, is characterized by a hardness characterized by an R-value of at least 200, preferably at least 400, more preferably at least 550, most preferably at least 700, wherein the R-value is the hardness relative to the glyceride content and STFA-content of the glyceride composition and is defined as $$R=T/(S \times STFA \times F) \times 10000$$

in which

T is the hardness of the edible product expressed in gram and measured with a texture meter at 20° C. using a metal cylindrical probe of a diameter between 2.5 and 4.5 mm, to a penetration depth of 10 mm. When measurement to such a depth is not possible, the maximum value found during measurement to the maximum attainable penetration depth is taken.

S is the bottom surface of the cylindrical probe expressed in mm$^2$ STFA is the sum of saturated and trans fatty acids of the glyceride composition expressed in wt. % with respect to the total weight of the glyceride composition.

F is the amount of glyceride composition with respect to the total weight of the edible product, expressed in wt. %

In this context, the wording "hardness measured with a texture meter", means the maximal force (expressed in gram) the instrument has to apply, to penetrate with a cylindrical probe of a certain diameter to a certain depth into the product.

This method is widely used in food industry. Instruments, using this principle that are suitable for use as texturemeter are for instance the TA-XT2 texture analyzer from Stable Micro Systems (SMS), or the Stevens-LFRA Texture Analyser. Preferably use is made of an SMS texture analyzer equipped with a stainless steel cylindrical probe with a diameter of 3 mm operated at a probe speed of 0.5 mm/sec to a penetration depth of 10 mm. Other probes and measuring conditions have been tested. However, their influence on the final R-values measured were minimal. Texture depends clearly on the fat content of the edible product and it's STFA-level, i.e. its content on saturated and trans fatty acids. Based on the R-value a relative comparison between different products, having different fat contents and STFA-levels, can be done.

The R-value of the edible product of this invention will usually be less than 10000, often less than 6000.

Those edible products will further show the above-described technical features. In these edible products
(1) the triglyceride composition preferably has an STFA-content of less than 35 wt. %, preferably less than 30 wt. %, most preferably less than 25 wt. %, STFA-content meaning the sum of saturated and trans fatty acids,
(2) and the sum of all saturated and unsaturated fatty acids contained in the glyceride composition having 8 up to and including 18 carbon atoms is at least 90 wt. % with respect to the weight of the glyceride composition, preferably at least 95 wt. %, most preferably at least 97 wt. %, The fat continuous, structured edible product of this invention may take any form considered suitable by the person skilled in the art, for example it may be confectionery compositions, in particular a cream, a coating, a tablet, a filling, a filled chocolate product, a non-emulsified spread, a culinary product, solid fat ingredients for food products, soft cheese, or any other edible product known to the person skilled in the art.

The edible product of this invention may be used in the production of further food products such as for example those selected from the group consisting of a filled chocolate product, a biscuit coated with a cream layer wherein the cream layer as such may be further coated with a coating or not, a biscuit having a cream layer sandwiched between two or more biscuits, extruded products with an interior structured filling, baked products with a structured filling, filled or topped confectionery products, filled or topped culinary products or any other food product known to the person skilled in the art.

The present invention also relates to the use of a triglyceride composition for producing the above-described structured, fat continuous edible product. Such a triglyceride composition preferably contains less than 45 wt. %, preferably less than 40 wt. %, more preferably less than 35 wt. %, more preferably less than 30 wt. %, most preferably less than 25 wt. % of saturated fatty acids. The triglyceride composition further preferably contains less than 10, preferably less than 5 wt. % of trans unsaturated fatty acids, more preferably less than 2 wt. %. In addition the C8-18 fatty acid content preferably is at least 90 wt. %, the C18 fatty acid content is at least 75 wt. %, preferably at least 85 wt. %, more preferably at least 90 wt. %, the SUS content preferably is at least 8 wt. % with respect to the weight of the triglyceride composition, preferably at least 10, more preferably at least 15, most preferably at least 18 wt. %, wherein S is a saturated fatty acid containing C16-18, U is unsaturated fatty acid having at least 18 C atoms, the content of the sum of U3+SU2 triglycerides is preferably at least 45 wt. %, more preferably between 50 and 90 wt. %, the S3 content of the triglyceride composition is preferably less than 15 wt. %, preferably less than 10 wt. %, more preferably less than 5 wt. %, most preferably less than 2.5 wt. %. Preferably the triglyceride composition has an SFC at 20° C. of more than 5% and less than 50%. The present invention therefore also relates to the above-described a triglyceride composition and the use thereof for the production of the above-described structured, fat continuous edible product.

The present invention further relates to the use of such a triglyceride composition for the production of a food product from the group of consisting of confectionery compositions, in particular a cream, a coating, a tablet, a filling, a filled chocolate product, a biscuit coated with a cream layer wherein the cream layer as such may be further coated with a coating or not, a biscuit having a cream layer sandwiched between two or more biscuits, non-emulsified spreads, culinary products, solid fat ingredients for food products, soft cheese, extruded products with an interior structured filling, baked products with a structured filling. These are in fact food products which contain the above-described edible composition and triglyceride composition.

For producing the edible product of the present invention, several processes may suitably be used. However, the process for producing the above-described structured fat continuous edible product preferably comprises the steps of blending
  20-100 wt. % of a triglyceride composition
  0-80 wt. % of a filler material
  less than 15 wt. % of water
and the step of inducing crystallisation of the triglyceride composition into a stable crystalline form and building of a solid structure. Preferably all of the filler material is added at once, since addition of the filler material in a later stage induces lump formation. Thereby the edible product and triglyceride composition show the technical features described hereabove.

According to a first preferred embodiment of a process for producing the edible product of this invention, the process comprises the steps of blending
  (1) between 20 and 100 wt. % with respect to the total weight of the edible product of a triglyceride composition in an at least partly, preferably completely, molten form, with
  (2) between 0 and 80 wt. % of a filler material
  (3) and between 0 and 10 wt. % with respect to the weight of the edible product of water,
followed by a second step which involves cooling of the blend to a temperature between 17 and 35° C., preferably between 20 and 30° C., most preferably between 22 and 28° C., after which mixing and homogenizing is stopped, followed by a hardening step during which the product is permitted to build a structure upon further cooling and stabilisation.

Cooling in the second step is preferably carried out with simultaneous mixing and homogenizing of the blend as this helps to build the final structure more rapidly. Final cooling after mixing may be carried out with or without forced cooling, preferably under gentle cooling conditions. Compared to the third preferred process disclosed below, the product may need more time to acquire its final hardness, but it will give a similar product in terms of hardness and nice melting properties in the mouth.

It is further preferred to leave the structured, fat continuous edible product after a solid structure is obtained upon crystallization of at least part of the triglyceride component, for stabilization of the crystallized fat, with the purpose of increasing the hardness of the edible product.

According to a second preferred embodiment of a process of this invention, a tempering step is used whereby the above described mixture with the triglyceride composition in the molten state is first cooled, after which the edible product is re-heated to melt unstable crystals, followed by a second cooling step. In this case, preferably use is made of a tempering machine.

According to a third preferred embodiment of a process of this invention, an amount of a tempering additive is added to the edible product. The tempering additive contains a minimum working amount of crystallized fat in the Beta-form. Examples of such tempering additives are described in EP 294 974 and EP 276 548. The amount of tempering additive used will usually be less than 10 wt. %, preferably less than 5 wt. %, more preferably less than 2 wt. %, most preferably less than 1 wt. %, expressed on total edible product. According to that process, the edible product, with its glyceride part or the majority of it in the molten form, is first homogenized, to blend all ingredients. Thereafter the blend is cooled to a temperature below the melting temperature of the crystallized fat in the Beta-form, present in the tempering additive. The tempering additive is mixed into the mass. The inventors have found that quickly after that, the product starts solidifying. After addition, the product may be further cooled by a forced cooling step, or it can also be further left to cool to room temperature.

When applying one of the three previous processes, the time needed to build the edible products' desired hardness will mostly be less than 12 hours, often less than 6, most preferably less than 2 hours from the start of the hardening step.

A fourth preferred embodiment of a process for producing the structured, fat continuous edible product of this invention, has been found to be particularly suitably for producing edible products containing a high amount of fat, preferably 70 to 100 wt. % with respect to the weight of the edible product. According to that process a completely or almost completely molten glyceride blend, is mixed with maximum 30 wt. % with respect to the weight of the edible product of at least one filler material, while simultaneously cooling and agitation. Upon cooling the high melting glycerides start to crystallize, causing an increase of the viscosity. The inventors have observed that when agitation is stopped, the material builds soon a solid or semi-solid texture, meaning that its looses its liquid, free flowing state. Agitation speed should be sufficiently high in order to minimise the risk to formation of large glyceride crystals or crystal agglomerates that could cause a grainy texture and mouthfeel. In this process, the product is preferably cooled to a temperature between 12 and 28° C., preferably between 15 and 25° C., most preferably between 17 and 23° C. with simultaneous agitation. With this fourth embodiment of the process it is possible to obtain a product that forms a solid texture after less than 60 minutes, preferably less than 30, most preferably less than 15 minutes after stopping the agitation.

The edible product obtained with the preferred embodiments of the process for producing the edible product of this invention is already obtaining structure upon partial crystallisation of the triglyceride composition in the blend. Thereby at least part of the filler material, but preferably all the filler material is present when blending.

In the preparation of hard, structured edible products, many processes are known that involve a heating step like cooking, baking, roasting, extrusion upon which the edible product obtains a hard structure. The edible products according to the present invention however, obtain a solid structure upon crystallization of at least part of the glyceride component. This happens upon cooling from the molten state or/and by use of a tempering additive. Crystallisation can possibly be followed by a stabilization of the crystallized fat, leading to a further increase of the hardness of the edible product.

The invention is further illustrated in the examples and comparative examples given below.

EXAMPLES

Example 1

A filling composition was made according to filling D of Example 3 of EP-A-731 645. The filling recipe was as follows:

TABLE 1

| | |
|---|---|
| Low SAFA fat I | 45% |
| Sugar | 35% |
| Skimmed milk powder | 10% |
| Hazelnut paste | 10% |
| Lecithin | 0.4% |

The low SAFA fat (fat I) that was used consisted of 30 wt. % with respect to the weight of the fat composition of fat I, of SOS-fat with an IV of 33.7, and was obtained through enzymatic interesterification and fractionation and 70% of high oleic sunflower oil. The SAFA-content of this fat was 24.3 wt. %, the TFA-content of the fat was 0.1 wt. %. The fat phase, representing 50 wt. % of the filling, consisted of 90 wt. % of fat 1 and 10 wt. % of hazelnut oil. The characteristics of the fat phase are described in table 2 as LS Fat A.

TABLE 2

| | STFA % | N20 % | N35 % | C-22 % | Probe diameter mm | Probe speed mm/sec | Texture g | R |
|---|---|---|---|---|---|---|---|---|
| LS fat A | 22.9 | 15.6 | 0.1 | 0 | 3 | 0.5 | 224 | 276.9 |
| LS fat A | 22.9 | 15.6 | 0.1 | 0 | 3 | 1.0 | 273 | 330.9 |
| LS fat A | 22.9 | 15.6 | 0.1 | 0 | 6 | 0.5 | 839 | 259.3 |
| Reference Fat D | 41.7 | 68.0 | — | 33.5 | 4.4 | | 158 | 49.9 |

(*) The TFA-content of reference fat D was not mentioned and is supposed to be negligible.

The filling was made by mixing the ingredients, refining the blend on a 3-roll refiner and conching at 57.6° C. The filling was then cooled to 29° C. and 0.2 wt. % with respect to the weight of the composition of Chocoseed A was added. Chocoseed A is a product of Fuji Oil containing a minimum working amount of SUS-triglyceride, crystallised in the Beta-form. The filling and the Chocoseed were mixed well. Al-cups were filled and put in an incubator at 20° C. for 24 hrs. Texture of the filling was measured at that temperature with an SMS-texture meter, using probe of 3 mm diameter, speed 0.5 mm/sec, depth 10 mm.

For comparison with example 1, a measurement with a probe speed of 1 mm/sec was also done, as well as a measurement with a probe of 6 mm diameter. This did not significantly alter the R-value. At 20° C. a texture of 224 g was found with the 3 mm probe, giving an R-value value of 276.9. For the 6 mm probe, T was 839 g corresponding with an R value of 259.3, which is quite similar to the R-value with the 3 mm probe. In EP-A-731.645 it is described that reference sample D was measured with a 4.4 mm probe; a texture of 158 g was found, which means an R-value of 49.9.

The filling made with LS Fat A was evaluated by a taste panel, which concluded that it had a good, creamy mouthfeel and nice melting properties.

From this test it became apparent that although the LS fat A had a SAFA-content which was significantly lower than reference fat D of EP-A-731.645 (22.9 wt. % vs. 41.7 wt. %), the structure of the filling obtained with the LS fat A was significantly harder than the hardness obtained with reference fat D: the R-value is more than 5.5 times higher. The higher hardness with the fat according to the invention was obtained although fats described in EP-A-731.645 are claimed to combine a low SAFA-level with a good hardness in the end product. The LS Fat A of the present invention presents the advantage that over EP-A-731.645 that no special long chain ingredients like BOO-triglycerides had to be used and no long cooling and holding procedures had to be applied in order to get a firm structure. It is further remarkable that at 20° C. a much harder structure was obtained with LS Fat A than with reference sample D, knowing that the solid fat content at 20° C. of LS Fat A was only 15.6%, compared to 68% for reference sample D.

Example 2

A confectionery cream was made according to the following recipe:

TABLE 3

| Low SAFA fat I | 40% |
| Sugar | 30% |
| Skimmed milk powder | 30% |
| Lecithin | 0.1% |

The same low SAFA fat as in example 1 (fat I) was used, meaning that the STFA content of the total fat in the recipe was 24.4 wt. %.

A cream was prepared in 4 different ways: all methods started from the molten fat that was blended with the dry ingredients in a conche at 58° C.

Example 2.1

Method 1

Part of the product was transferred to a metal pot, which was put with its bottom in a water bath at 15° C. The product was cooled to 29° C. under continuous stirring. Then 0.2% of chocoseed A was added and mixed into the blend. Thereafter, the product was transferred to sample cups and further cooled down to room temperature without additional forced cooling.

Example 2.2

Method 2

Part of the product was transferred to a metal pot, which was put with its bottom in a water bath at 15° C. The product was cooled to 28° C. under continuous stirring. Then the product was transferred to sample cups and further cooled down to room temperature without additional forced cooling.

Example 2.3

Method 3

Part of the product was transferred to a tempering machine, type Aasted AMK 50. The chocolate temperatures in zones 1, 2 and 3 were 30.1, 25.5 and 27° C. Part of the tempered product was transferred to sample cups and further cooled down to room temperature without additional forced cooling.

Example 3

Method 4

An amount of product was taken from the conche and directly transferred to sample cups. No forced cooling or mixing were applied. The cups were left at room temperature to cool down.

The texture of the products put for 1 hour in an incubator at 20° C. was measured 1 day after their preparation, applying an SMS-texture meter with 3 mm diameter probe at a speed of 0.5 mm/sec to a depth of 10 mm. Following results were found for the texture of the differently prepared creams:

TABLE 4

| | Probe diameter mm | Texture g | R |
|---|---|---|---|
| method 1 | 3 | 764 | 1112.5 |
| method 2 | 3 | 501 | 711.8 |
| method 3 | 3 | 835 | 1158.0 |
| method 4 | 3 | 118 | 159.8 |

As can be seen from these results, methods 1, 2, 3 gave good to very good results in relation to hardness of the end product, whereas method 4, where no cooling step or mixing were applied during cooling, gave a poor structure.

Example 4

A confectionery cream was made according to the recipe of table 5.

TABLE 5

| Amount of components given in wt. %. | |
|---|---|
| Fat II | 35.0% |
| Sugar | 32.5% |
| Skimmed milk powder | 32.5% |
| Lecithin | 0.4% |

Fat II with a low SAFA content was prepared by mixing high oleic sunfloweroil with an SOS-fat with an IV of 33.7, in a ratio which was such that the content of trans and saturated fatty acids was 34.8 wt. %. A cream was made by mixing the ingredients as disclosed in table 5, refining the blend on a 3-roll refiner and conching at 55° C. The cream was cooled to 29° C., 0.2 wt. % of Chocoseed A was added. The cream was transferred to a plastic pot with a diameter of 8 cm until a product layer thickness of 3.5 cm thickness was obtained. The product was left to cool at room temperature.

The texture of the filling was measured after leaving the product for 1 day at 20° C. with an SMS-texturemeter, using a stainless steel probe of 3 mm diameter, speed 0.5 mm/sec, depth 10 mm. The results of this measurement are given in table 9a below.

TABLE 5a

|  | STFA % | Texture g | R |
| --- | --- | --- | --- |
| fat II | 34.8 | 3400 | 3951.1 |

From table 5a it appears that a edible product could be made with a hard structure in spite of its low STFA-content. The product was tasted and found to have nice melting properties in the mouth, without giving any sensation of waxyness.

Example 5

A fat composition was prepared which contained shea butter. The shea butter contained 48.2% SAFA and 42.1% SUS-triglycerides.

This shea butter was blended with high oleic sunflower in a ratio 55/45 so as to make a fat blend with a saturated fatty acid content of 30 wt. %. The content of saturated and trans fatty acids was 30.7 wt. %. This fat blend was used to make a cream according to the recipe in table 6. Thereto, use was made of chocoseed A, added at 29° C., followed by mixing. The cream was transferred to sample cups and further cooled in a ventilated cooling device for 30' at 15° C. Thereafter the sample cups containing the cream were stored at room temperature (23° C.+/−1° C.). The texture was measured at different time intervals, the results are listed in table 7.

TABLE 6

| amounts of the components are given in wt. %. | |
| --- | --- |
| Fat | 37.0% |
| Sugar | 38.0% |
| Skimmed milk powder | 16.0% |
| Cocoapowder | 9.0% |
| Lecithin | 0.4% |

TABLE 7

|  | g | R |
| --- | --- | --- |
| after 2.5 hrs | 551.2 | 686.8 |
| after 1 day | 594.3 | 740.5 |
| after 1 week | 583.9 | 727.6 |

From table 7 it appears that even with shea butter, having a limited content of SUS-triglycerides, products can be made with a strong and stable texture and a limited SAFA-content. The texture measured after 1 day and after 1 week, are fully comparable.

Example 6

Three types of creams were made using different types of fat:
1. a low SAFA fat, similar to fat I from example I, based on enzymatic StOSt-fat in combination with high oleic sunflower, having an STFA content of 24.5%
2. a highly saturated lauric fat being a combination of coconut oil, hydrogenated coconut oil and hydrogenated palm kernel oil, with an STFA content of 91.6% (Comparative fat II)
3. a hydrogenated fat based on rapeseedoil and palmolein, combined with palm oil, having an STFA content of 56.7% (Comparative fat III)

The characteristics of the 3 fats are given in table 8.

TABLE 8

|  | Fat I | Comp Fat II | Comp Fat III |
| --- | --- | --- | --- |
| SAFA | 24.4 | 91.6 | 42.3 |
| TFA | 0.1 | 0.0 | 14.4 |
| STFA | 24.5 | 91.6 | 56.7 |
| SFC 20 | 17.4 | 43.1 | 33.1 |
| SFC 35 | 0.3 | 0.0 | 4.0 |

With these fats, creams were made according to the recipe of table 6. The cream with fat I, was tempered by adding 0.2% Chocoseed A at 29° C., followed by further cooling. The other samples needed no tempering. Sample cups were filled and then cooled during 30' at 15° C. The cups were then stored for one week at 20° C. to stabilise. For each of the 3 creams, chocolate discs were put on top of a sample cup, covering the whole upper area. The discs were put on top of the cups when the creams had a temperature of around 28° C. The chocolate discs, were made of tempered dark chocolate and had a thickness of 2.6 mm. After stabilisation, samples of the creams were put at 3 different temperatures (20, 25 and 28° C.) to check stability and oil migration to the chocolate disc.

After 1 month storage the texture of the cream was measured of an uncovered sample as well as the hardness of the chocolate disc, put on top of a cup, using an SMS-texturemeter with 3 mm diameter probe. Blooming was followed up at 20° C. A score for blooming was given from "−" indicating no blooming, to "++++" indicating very strong blooming The results are given in table 9 and 10.

TABLE 9

| Texture measurements | | | |
| --- | --- | --- | --- |
|  | Fat I | Comp Fat II | Comp Fat III |
| Cream |  |  |  |
| 1 month 20° C. | 410.7 | 594.0 | 409.3 |
| Chocolate disc |  |  |  |
| 1 month 20° C. | 1937.6 | 1808.5 | 2181.7 |
| 1 month 25° C. | 672.7 | 120.8 | 482 |
| 1 month 28° C. | 256.0 | No | 45.3 |

As can be seen from table 9, the three fats had a more or less similar behaviour towards possible softening of the chocolate at 20° C., while at higher temperatures, fat I was clearly performing the best, regardless of its high liquid oil content. At 28° C., the chocolate discs for both comparative fats were strongly deformed, which was not the case for fat I.

TABLE 10

|  | 20° C. | | |
| --- | --- | --- | --- |
| Blooming | Fat I | Comparative Fat I | Comparative Fat II |
| 1 week | − | − | − |
| 2 weeks | − | − | − |
| 3 weeks | − | − | − |
| 4 weeks | − | − | − |
| 5 weeks | − | − | − |
| 6 weeks | − | + | − |
| 8 weeks | +/− | ++ | − |
| 10 weeks | + | +++ | +/− |

As can be seen from table 10, fat I and Comparative Fat III, had a more or less comparable tendency towards blooming at 20° C., while Comp Fat II starts blooming earlier and stronger.

Fat I thus has a good compatibility with chocolate as well as a high oil retention capacity compared to the known fats having a higher STFA-content.

Example 7

The shea butter of example 5 was used to make two creams which contained 24.8 wt. % of STFA on fat basis. First, the amount of unsaponifiable material in the shea butter was reduced to 4.0%, by dissolving it in acetone at 35° C., followed by filtration. The recipe of table 3 was used.

The fat was molten and mixed with the dry ingredients at 55° C., followed by two different treatments:

method A, according to the invention: a sample was taken and cooled in a metal pot with its bottom in a water bath at 15° C., under slight stirring to 29° C., whereafter 0.2% of chocoseed A was added and mixed into the blend. The product was then transferred to sample cups and cooled to room temperature without additional forced cooling.

method B: a sample was taken and left to cool at room temperature without stirring. At 28° C. part of the product was transferred to sample cups and further left to cool at room temperature. Method B is a comparative example.

When transferred to the sample cups, a sample of each of the creams was taken and immediately measured by DSC using a Mettler Toledo Star System with a temperature regime as follows: the cream is kept for 3 minutes at 20° C., thereafter the temperature of the cream is decreased to −40° C. at a cooling rate of −5° C./min, thereafter the cream is kept for 3 minutes at −40° C., whereafter the temperature is increased from −40° C. to +60° C. at a heating rate of +5° C./min. The melting profiles obtained by subjecting sample A and B to this temperature-time regime, are shown in FIG. 1. In FIG. 1 A-1 refers to preparation method A, B-1 refers to preparation method B. As can be seen from these graphs, sample A containing the temper seed shows a pronounced melting peak for the high melting triglyceride part at 28.6° C., which occurs at a temperature that is clearly higher than the highest melting peak of sample B occurring at 21.5° C.

After 20 hours, again a sample of both creams was taken from their sample cup and measured by DSC, using the same method. The melting profiles are indicated with A-2 and B-2. Sample A-2 shows a clear peak at 32° C., while sample B-2 shows a less pronounced profile. The texture was measured as well after 20 hours, applying an SMS-texturemeter with 3 mm diameter probe at a speed of 0.5 mm/sec to a depth of 10 mm. The samples were also tasted. The results obtained are summarised in table 11.

After 1 week, again a sample of both creams was taken from their sample cup and measured by DSC, using the same method. The melting profiles are indicated with A-3 and B-3. The graph for sample A-3 coincides with sample A-2 showing a clear peak at 32° C., while sample B-3 shows also a clear peak now, but at a much more elevated temperature: 37.0° C.

Thus for sample A-2 and A-3, a shift for the high melting triglyceride peak when measured after 20 hours of stabilisation after having been produced compared with the high melting peak of the product that has been left for one week to stabilise after having been produced, of 0° C. is observed.

TABLE 11

| | method A | method B |
|---|---|---|
| Texture | 603 | no |
| R-value | 860.4 | no |
| Taste | good melting | sandy |

From these results it appears that sample A obtained a strong structure. On the DSC, it shows a shift of 5° C. in melting temperature for the high-melting SUS-containing part of the fat composition, compared to the same peak for sample B, once the latter is stabilised. Sample B had a weak texture and had a sandy mouthfeel, indicating the presence of large fat crystals or crystal agglomerates.

The invention claimed is:

1. A structured, fat continuous edible product, wherein the edible product comprises, expressed on total product basis,
   a) less than 30 wt. % of saturated fatty acids,
   b) between 25 and 60 wt. % of a triglyceride composition
   c) between 40 and 75 wt % of a filler material, and
   d) less than 15 wt. % of water
wherein the triglyceride composition comprises, with respect to the weight of the triglyceride composition
   e) less than 45 wt. % of saturated fatty acids,
   f) less than 10 wt. % of trans unsaturated fatty acids
   g) at least 8 wt. % of SUS triglycerides, wherein S is a C16-18 saturated fatty acid, and U is an unsaturated fatty acid having at least 18 C atoms,
   h) less than 15 wt. % of S3,
   i) at least 90 wt. % of C8-18 fatty acids,
   j) at least 75 wt. % of C18 fatty acids comprising saturated and unsaturated fatty acids, and
   k) an SFC at 20° C. of between 5 and 50%.

2. The structured, fat continuous edible product according to claim 1, wherein the product comprises, expressed on the total weight of the product, less than 28 wt. % of saturated fatty acids, and wherein the triglyceride composition comprises with respect to the weight of the triglyceride composition,
   less than 40 wt. % of saturated fatty acids,
   less than 5 wt. % of trans unsaturated fatty acids,
   less than 10 wt. % of S3,
   at least 85 wt. % of C18 fatty acids including saturated and unsaturated fatty acids.

3. The product according to claim 2 comprising less than 25 wt. % of saturated fatty acids.

4. The product according to claim 2 wherein the triglyceride composition comprises less than 35 wt. % of saturated fatty acids.

5. The product according to claim 4 wherein the triglyceride composition comprises less than 30 wt. % of saturated fatty acids.

6. The product according to claim 5 wherein the triglyceride composition comprises less than 25 wt. % of saturated fatty acids.

7. The product according to claim 2 wherein the triglyceride composition comprises less than 2 wt. % of trans unsaturated fatty acids.

8. The product according to claim 2 wherein the triglyceride composition comprises less than 5 wt. % of S3.

9. The product according to claim 8 wherein the triglyceride composition comprises less than 2.5 wt. % of S3.

10. The product according to claim 2 wherein the triglyceride composition comprises at least 90 wt. % of C18 fatty acids including saturated and unsaturated fatty acids.

11. The structured, fat continuous edible product according to claim 1, wherein the food product comprises less than 5 wt. % of water with respect to the total weight of the food product.

12. The product according to claim 11 comprising less than 2 wt. % of water.

13. The structured, fat continuous edible product according to claim 1, wherein the product is not an emulsion.

14. The structured, fat continuous edible product as claimed in claim 1, wherein at least part of the triglycerides is in a crystallised form for retaining the oil component of the product.

15. The structured, fat continuous edible product as claimed in claim 1, wherein at least 50 wt. % of the crystallised fat is crystallised in the Beta-form.

16. The product according to claim 15 wherein at least 85 wt. % of the crystallized fat is crystallized in the Beta-form.

17. The structured, fat continuous edible product as claimed in claim 1, wherein the hardness of the product after storage at room temperature for 1 day following production, and the hardness after storage at room temperature for 1 week, differs by less than 25%.

18. The product according to claim 17 wherein the hardness of the product after storage at room temperature for 1 day following production, and the hardness after storage at room temperature for 1 week, differs less than 10%.

19. The structured, fat continuous edible product as claimed in claim 1, wherein the triglyceride composition present in the edible product has a DSC profile which shows a reduction in melting point for the high melting triglyceride peak of at least 2° C. when measured using a product which has been stored at room temperature for at least 1 day after production, compared to the DSC-profile of the same product measured after the product has been heated to a temperature high enough to melt the fat, cooled without stirring at room temperature, and left at room temperature for one week, whereby the DSC profile is measured by subjecting each product to a temperature-time regime according to which the temperature of the product is maintained for 3 minutes at a temperature of 20° C., followed by decreasing the temperature from 20° C. to −40° C. at a cooling rate of −5° C./min, followed by maintaining the temperature of the product for 3 minutes at −40° C., followed by increasing the temperature of the product from −40° C. to +60° C. at a heating rate of +5° C./min.

20. The product according to claim 19 wherein the DSC profile of the triglyceride composition shows a reduction in melting point for the high melting triglyceride peak of at least 3° C.

21. The product according to claim 20 wherein the DSC profile of the triglyceride composition shows a reduction in melting point for the high melting triglyceride peak of at least 4° C.

22. The structured, fat continuous edible product as claimed in claim 1, wherein the triglyceride composition comprises at least 90 wt. %, with respect to the weight of the triglyceride composition, of saturated and unsaturated fatty acids having 14 to 18 carbon atoms.

23. The product according to claim 22 wherein the triglyceride composition comprises at least 95 wt. % of saturated and unsaturated fatty acids having 14-18 carbon atoms.

24. The product according to claim 23 wherein the triglyceride composition comprises at least 97 wt. % of saturated and unsaturated fatty acids having 14-18 carbon atoms.

25. The structured, fat continuous edible product as claimed in claim 1, wherein SUS-triglycerides comprise 10-45 wt. % of the triglyceride composition, and wherein S is a saturated fatty acid having 16-18 carbon atoms and U is an unsaturated fatty acid having 18 carbon atoms or more.

26. The structured, fat continuous edible product as claimed in claim 25, wherein at least 50 wt. % of the SUS triglycerides consists of StUSt and/or PUSt, in which St is stearic acid, P is palmitic acid, S is a C16-18 saturated fatty acid and U is an unsaturated fatty acid having at least 18 carbon atoms.

27. The product according to claim 26 wherein at least 70 wt. % of the SUS triglycerides consist of StUSt and/or PUSt triglycerides.

28. The product according to claim 27 wherein at least 80 wt. % of the SUS triglycerides consist of StUSt and/or PUSt triglycerides.

29. The structured, fat continuous edible product as claimed in claim 25, wherein at least 50 wt. % of the SUS triglycerides consists of StOSt, in which St is stearic acid and O is oleic acid.

30. The structured, fat continuous edible product as claimed in claim 29, wherein the triglyceride composition additionally comprises POSt and wherein the StOSt to POSt ratio of the triglyceride composition is at least 2.5:1.

31. The product according to claim 30 wherein the StOSt to POSt ratio of the triglyceride composition is at least 5:1.

32. The product according to claim 31 wherein the StOSt to POSt ratio of the triglyceride composition is at least 6:1.

33. The product according to claim 25 wherein the triglyceride composition comprises at least 15 wt. % SUS-triglycerides.

34. The product according to claim 25 wherein the SUS-triglycerides content is less than 40 wt. % of the triglyceride composition.

35. The product according to claim 29 wherein at least 60 wt. % of the SUS triglycerides consists of StOSt triglycerides.

36. The product according to claim 35 wherein at least 70 wt. % of the SUS triglycerides consists of StOSt triglycerides.

37. The product according to claim 36 wherein at least 80 wt. % of the SUS triglycerides consists of StOSt triglycerides.

38. The structured, fat continuous edible product as claimed in claim 1, wherein the triglyceride composition comprises less than 38 wt. % of SU2 triglycerides.

39. The product according to claim 38 wherein the triglyceride composition comprises less than 30 wt. % SU2-triglycerides.

40. The product according to claim 39 wherein the triglyceride composition comprises less than 25 wt. % SU2-triglycerides.

41. The structured, fat continuous edible product as claimed in claim 1, wherein the triglyceride composition comprises less than 2.5 wt. % of C22 fatty acids.

42. The product according to claim 41 wherein the triglyceride composition comprises less than 1.0 wt. % C22 fatty acids.

43. The structured, fat continuous edible product as claimed in claim 1, wherein the triglyceride composition has a N20 of ≦40% and a N35 of ≦20%, wherein N20 and N35 are the solid fat content of the triglyceride part as measured according to method IUPAC 2.150a.

44. The product according to claim 43 wherein the triglyceride composition has an N20 of ≦35%.

45. The product according to claim 44 wherein the triglyceride composition has an N20 of ≦25%.

46. The product according to claim 45 wherein the triglyceride composition has an N20 of ≦20%.

47. The product according to claim 43 wherein the triglyceride composition has an N35 of ≦15%.

48. The structured, fat continuous edible product as claimed in claim 1, wherein the triglyceride composition comprises at least one component selected from the group consisting of a hard and a semi hard fat and at least one component selected from the group consisting of a liquid oil and a blend of at least two liquid oils, the hard fat being solid at room temperature and the semi-hard fat being semi-solid at room temperature, and the liquid oil and oil blends being liquid at room temperature.

49. The structured, fat continuous edible product as claimed in claim 48, wherein the amount of the at least one component selected from the group consisting of a hard and a semi-hard fat ranges from 10-90 wt. % of the weight of the triglyceride composition and the amount of the at least one component selected from the group consisting of a liquid oil and a blend of at least two liquid oils ranges from 10-90 wt. % of the weight of the triglyceride composition.

50. The product according to claim 49 wherein the amount of the at least one component selected from the group consisting of a hard and a semi-hard fat with respect to the weight of the triglyceride composition ranges from 15-60 wt. %.

51. The product according to claim 50 wherein the amount of the at least one component selected from the group consisting of a hard and a semi-hard fat with respect to the weight of the triglyceride composition ranges from 20-45 wt. %.

52. The product according to claim 49 wherein the amount of the at least one component selected from the group consisting of a liquid oil and a blend of at least two liquid oils ranges from 40-85 wt. % with respect to the weight of the triglyceride composition.

53. The product according to claim 52 wherein the amount of the at least one component selected from the group consisting of a liquid oil and a blend of at least two liquid oils ranges from 55-80 wt. % with respect to the weight of the triglyceride composition.

54. The structured, fat continuous edible product as claimed in claim 48, wherein the at least one component selected from the group consisting of a liquid oil and a blend of at least two liquid oils comprises at least one vegetable oil selected from the group of rapeseed oil, corn oil, soy oil, sunflower seed oil, cotton seed oil, maize oil, olive oil, hazelnut oil, groundnut oil, palm oil or a liquid fraction of shea butter, a fraction of one of these liquid oils, and blends of at least two of the afore mentioned oils and fractions thereof.

55. The structured, fat continuous edible product as claimed in claim 48, wherein the at least one component selected from the group consisting of a hard fat and a semi-hard fat comprises 25-85 wt. % of SUS-triglycerides, wherein S is a saturated fatty acid having 16-18 carbon atoms and U is an unsaturated fatty acid having 18 carbon atoms or more.

56. The product according to claim 55 wherein the at least one component selected from the group consisting of a hard fat and a semi-hard fat comprises at least 35 wt. % of SUS-triglycerides with respect to the weight of the hard or semi-hard fat.

57. The product according to claim 56 wherein the at least one component selected from the group consisting of a hard fat and a semi-hard fat comprises at least 40 wt. % of SUS-triglycerides with respect to the weight of the hard or semi-hard fat.

58. The product according to claim 55 wherein the SUS-content of the at least one component selected from the group consisting of a hard fat and a semi-hard fat is less than 75 wt. % with respect to the weight of the hard or semi-hard fat.

59. The product according to claim 58 wherein the SUS-content of the at least one component selected from the group consisting of a hard fat and a semi-hard fat is less than 65 wt. % with respect to the weight of the hard or semi-hard fat.

60. The product according to claim 59 wherein the SUS-content of the at least one component selected from the group consisting of a hard fat and a semi-hard fat is less than 60 wt. % with respect to the weight of the hard or semi-hard fat.

61. The structured, fat continuous edible product as claimed in claim 48, wherein the at least one component selected from the group consisting of a hard fat and a semi-hard fat is selected from cocoa butter, shea butter, illipe butter, kokum fat, sal fat, allanblackia fat, mowrah butter, mango kernel fat, enzymatically prepared fat, and fractions thereof, and blends of at least two of the afore mentioned fats and fractions thereof.

62. The structured, fat continuous edible product as claimed in claim 48, wherein the hard fat comprises shea butter.

63. The product according to claim 62 wherein the shea butter comprises less than 7 wt. % of unsaponifiable material.

64. The product according to claim 63 wherein the shea butter comprises less than 4 wt. % of unsaponifiable material.

65. The structured, fat continuous edible product as claimed in claim 48, wherein the hard fat comprises an enzymatically prepared fat or a fraction thereof, where such enzymatically prepared fat or fraction thereof is characterised by an SUS content of 30 to 85 wt. %.

66. The product according to claim 65 wherein the enzymatically prepared fat and fraction thereof are characterised by a SUS content of 35-75 wt. %.

67. The product as claimed in claim 1, wherein the triglyceride composition is substantially free of hydrogenated fat components.

68. The structured, fat continuous edible product as claimed in claim 1, wherein the filler material comprises at least one component selected from the group consisting of: sugar, flour, starch, skimmed milk powder, whole milk powder, whey powder, cocoa powder, coffee powder, food grade organic solid powders, food grade inorganic solid powders, and blends of two or more of these components.

69. The structured, fat continuous edible product as claimed in claim 1, wherein the filler material has a mean particle size of smaller than 500 μm.

70. The product according to claim 69 wherein the filler material has a mean particle size of smaller than 100 μm.

71. The structured, fat continuous edible product as claimed in claim 1, wherein the hardness of the edible product is characterized by an R-value of at least 200, wherein the R-value is the hardness relative to the glyceride content and STFA-content of the glyceride composition and is defined as $$R = T/(S \times STFA \times F) \times 10000$$

in which:
T is the hardness of the food product expressed in grams and measured to a penetration depth of 10 mm at 20° C. using a texture meter with a 2.5-4.5 mm diameter metal cylindrical probe,
S is the bottom end surface area of the cylindrical probe expressed in mm$^2$,
STFA is the sum of saturated and trans fatty acids of the glyceride composition expressed in wt. % with respect to the total weight of the glyceride composition, and
F is the amount of glyceride composition with respect to the total weight of the food product, expressed in wt. %.

72. The product according to claim 71 wherein the hardness of the edible product is characterized by an R-value of at least 400.

73. The product according to claim 72 wherein the hardness of the edible product is characterized by an R-value of at least 550.

74. The product according to claim 73 wherein the hardness of the edible product is characterized by an R-value of at least 700.

75. The structured, fat continuous edible product as claimed in claim 1, wherein the edible product is selected from the group consisting of a confectionery product, a cream, a coating, a tablet, a filling, a filled chocolate product, a non-emulsified spread, a culinary product, a solid fat ingredient for a food products, and a soft cheese.

76. A process for producing the structured, fat continuous edible product as claimed in claim 1, comprising:
a) blending 25-60 wt. % of a triglyceride composition in an at least partly molten form with 40-75 wt. % of filler material and <15 wt. % of water; and
b) inducing crystallisation of the triglyceride composition into a stable crystalline form with a solid structure.

77. The process as claimed in claim 76, further comprising the steps of blending 25-60 wt. % of the triglyceride composition in an at least partly molten form with 40-75 wt. % of the filler material and 0-10 wt. % of water, followed by cooling the thus obtained blend to a temperature between 17 and 35° C. followed by hardening the food product into a solid structure.

78. The process according to claim 77 wherein the triglyceride composition is blended in a completely molten form.

79. The process according to claim 77 wherein the blend is cooled to a temperature between 20 and 30° C.

80. The process according to claim 79 wherein the blend is cooled to a temperature between 22 and 28° C.

81. The process according to claim 77 wherein the composition is cooled to a temperature between 17 and 23° C.

82. The process as claimed in claim 76, further comprising a tempering step whereby the mixture comprising the at least partly molten triglyceride composition is subjected to a first cooling step, followed by re-heating the composition to melt unstable crystals, followed by a second cooling step.

83. The process as claimed in claim 76, wherein less than 10 wt. % is added of a tempering additive, comprising a minimum working amount of crystallized fat in the Beta-form.

84. The process according to claim 83 wherein less than 5 wt. % with respect to the total weight of the food product is added of the tempering additive.

85. The process according to claim 84 wherein less than 1 wt. % with respect to the total weight of the food product is added of the tempering additive.

86. The process as claimed in claim 76, further comprising allowing the crystallized fat to stabilize after the triglyceride composition has crystallized.

87. The process as claimed in claim 86, wherein the triglyceride composition is crystallized and the crystallized fat is stabilized within 12 hours after blending is completed.

88. The process according to claim 87 wherein the triglyceride is crystallized and the crystallized fat is stabilized within 6 hours after blending is completed.

89. A food product comprising the structured, fat continuous edible product as claimed in claim 1, wherein the food product is selected from the group consisting of: a filled chocolate product, a biscuit coated with a cream layer wherein the cream layer as such may be further coated with a coating or not, a biscuit having a cream layer sandwiched between at least two biscuits, an extruded product with an interior structured filling, a baked product with a structured filling, a filled or topped confectionery product, and a filled or topped culinary product.

90. A process for the production of the structured, fat continuous edible product as claimed in claim 1, comprising the incorporation of a triglyceride composition into said edible product, wherein the triglyceride composition comprises:

less than 45 wt. % of saturated fatty acids,
less than 10 wt. % of trans unsaturated fatty acids,
at least 90 wt. % of C8-18 fatty acids,
at least 75 wt. % of C18 fatty acids comprising saturated and unsaturated fatty acids,
at least 8 wt. % SUS-triglycerides, wherein S is a saturated fatty acid containing 16-18 carbon atoms, and U is an unsaturated fatty acid having at least 18 carbon atoms,
at least 45 wt. % of U3+SU2,
less than 15 wt. % of S3,
and wherein the triglyceride composition has an SFC at 20° C. of 5-50%.

91. The process according to claim 90 wherein the structured, fat continuous edible product is selected from the group consisting of: a confectionery product, a cream, a coating, a tablet, a filling, a filled chocolate product, a biscuit coated with a cream layer wherein the cream layer as such may be further coated with a coating or not, a biscuit having a cream layer sandwiched between at least two biscuits, a non-emulsified spread, a culinary product, a solid fat ingredient for a food product, a soft cheese, an extruded product with an interior structured filling, and a baked product with a structured filling.

92. The method according to claim 90 wherein the triglyceride composition comprises less than 40 wt. % of saturated fatty acids.

93. The method according to claim 92 wherein the triglyceride composition comprises less than 35 wt. % of saturated fatty acids.

94. The method according to claim 93 wherein the triglyceride composition comprises less than 30 wt. % of saturated fatty acids.

95. The method according to claim 94 wherein the triglyceride composition comprises less than 25 wt. % of saturated fatty acids.

96. The method according to claim 90 wherein the triglyceride composition comprises less than 5 wt. % of trans unsaturated fatty acids.

97. The method according to claim 96 wherein the triglyceride composition comprises less than 2 wt. % of trans unsaturated fatty acids.

98. The method according to claim 90 wherein the triglyceride composition comprises at least 85 wt. % of C18 fatty acids.

99. The method according to claim 98 wherein the triglyceride composition comprises at least 90 wt. % of C18 fatty acids.

100. The method according to claim 90 wherein the triglyceride composition comprises at least 10 wt. % SUS.

101. The method according to claim 90 wherein the triglyceride composition comprises 50-90 wt. % U3+SU2.

102. The method according to claim 90 wherein the triglyceride composition comprises less than 10 wt. % S3.

103. The method according to claim 102 wherein the triglyceride composition comprises less than 5 wt. % S3.

104. The method according to claim 103 wherein the triglyceride composition comprises less than 2.5 wt. % S3.

105. The product according to claim 1 comprising 30-50 wt. % of the triglyceride composition.

* * * * *